United States Patent
Yoshino et al.

(10) Patent No.: US 10,518,363 B2
(45) Date of Patent: Dec. 31, 2019

(54) ALUMINUM ALLOY BRAZING SHEET HAVING HIGH STRENGTH, HIGH CORROSION RESISTANCE AND HIGH MATERIAL ELONGATION, AND METHOD OF MANUFACTURING HEAT EXCHANGER

(71) Applicant: MITSUBISHI ALUMINUM CO., LTD., Minato-ku, Tokyo (JP)

(72) Inventors: Michihide Yoshino, Shizuoka (JP); Masakazu Edo, Shizuoka (JP)

(73) Assignee: MITSUBISHI ALUMINUM CO., LTD., Tokyo (JP)

( * ) Notice: Subject to any disclaimer, the term of this patent is extended or adjusted under 35 U.S.C. 154(b) by 0 days.

(21) Appl. No.: 15/518,421

(22) PCT Filed: Nov. 9, 2015

(86) PCT No.: PCT/JP2015/081474
§ 371 (c)(1),
(2) Date: Apr. 11, 2017

(87) PCT Pub. No.: WO2016/076263
PCT Pub. Date: May 19, 2016

(65) Prior Publication Data
US 2017/0304957 A1 Oct. 26, 2017

(30) Foreign Application Priority Data
Nov. 10, 2014 (JP) ................. 2014-227777

(51) Int. Cl.
| | | |
|---|---|---|
| B23K 31/02 | (2006.01) | |
| B23K 35/28 | (2006.01) | |
| C22C 21/00 | (2006.01) | |
| C22F 1/04 | (2006.01) | |
| C22F 1/053 | (2006.01) | |
| F28F 19/06 | (2006.01) | |
| F28F 21/08 | (2006.01) | |
| B23K 1/00 | (2006.01) | |
| B23K 35/02 | (2006.01) | |
| C22C 21/10 | (2006.01) | |
| B23K 101/14 | (2006.01) | |

(52) U.S. Cl.
CPC .......... B23K 35/288 (2013.01); B23K 1/0012 (2013.01); B23K 35/0238 (2013.01); C22C 21/00 (2013.01); C22C 21/10 (2013.01); C22F 1/04 (2013.01); C22F 1/053 (2013.01); F28F 19/06 (2013.01); F28F 21/08 (2013.01); F28F 21/084 (2013.01); B23K 2101/14 (2018.08); F28F 21/089 (2013.01)

(58) Field of Classification Search
CPC .......... B23K 35/288; B23K 35/0238; B23K 1/0012; B23K 2201/14; F28F 21/084; F28F 19/06; C22C 21/10; C22F 1/053

USPC ..................... 228/245–262, 183, 56.3, 235.2
See application file for complete search history.

(56) References Cited

U.S. PATENT DOCUMENTS

| | | | | |
|---|---|---|---|---|
| 3,898,053 | A * | 8/1975 | Singleton, Jr. ....... | B23K 35/002 428/654 |
| 4,209,059 | A * | 6/1980 | Anthony ................. | F28F 19/06 165/133 |
| 4,317,484 | A * | 3/1982 | Tanabe .................. | F28F 19/004 165/134.1 |
| 5,176,205 | A * | 1/1993 | Anthony .............. | B23K 35/286 165/133 |
| 5,377,901 | A * | 1/1995 | Rungta .................... | B23K 1/19 228/183 |
| 5,744,255 | A * | 4/1998 | Doko ................... | B23K 35/286 165/134.1 |
| 6,261,706 | B1* | 7/2001 | Fukuda ................. | B32B 15/016 165/133 |
| 7,387,844 | B2* | 6/2008 | Ueda ................... | B23K 35/0238 428/213 |
| 8,226,781 | B2* | 7/2012 | Suzuki .................. | F28F 21/084 148/437 |
| 9,908,202 | B2* | 3/2018 | Marois ............... | B23K 35/0233 |
| 9,914,185 | B2* | 3/2018 | Itoh ..................... | B23K 35/0238 |

(Continued)

FOREIGN PATENT DOCUMENTS

| | | |
|---|---|---|
| CN | 104105804 A | 10/2014 |
| DE | 112013000740 T5 | 10/2014 |

(Continued)

OTHER PUBLICATIONS

International Search Report (ISR) and Written Opinion dated Feb. 16, 2016 issued in International Application No. PCT/JP2015/081474.

*Primary Examiner* — Kiley S Stoner
(74) *Attorney, Agent, or Firm* — Holtz, Holtz & Volek PCL

(57) ABSTRACT

An aluminum alloy brazing sheet has high strength, corrosion resistance and elongation, and includes an aluminum alloy clad material. The material includes a core material, one surface of which is clad with a sacrificial material and an other surface of which is clad with an Al—Si-based or Al—Si—Zn-based brazing filler metal. The core material has a composition containing 1.3 to 2.0% Mn, 0.6 to 1.3% Si, 0.1 to 0.5% Fe and 0.7 to 1.3% Cu, by mass, with the balance Al and impurities. The sacrificial material has a composition containing more than 4.0% to 8.0% Zn, 0.7 to 2.0% Mn, 0.3 to 1.0% Si, 0.3 to 1.0% Fe and 0.05 to 0.3% Ti, by mass, with the balance Al and impurities. At least the core material has a lamellar crystal grain structure. Elongation of material is at least 4% and a tensile strength after brazing is at least 170 MPa.

9 Claims, No Drawings

(56) References Cited

U.S. PATENT DOCUMENTS

| | | | | |
|---|---|---|---|---|
| 2003/0015573 A1* | 1/2003 | Kawahara | .......... | B22D 11/0622 228/183 |
| 2004/0131879 A1* | 7/2004 | Wittebrood | ........ | B23K 35/0238 428/650 |
| 2004/0185293 A1* | 9/2004 | Syslak | ............... | B23K 35/0238 428/654 |
| 2005/0011636 A1* | 1/2005 | Miyachi | .................. | F28F 19/06 165/133 |
| 2005/0064226 A1* | 3/2005 | Benedictus | ........ | B23K 35/0238 428/654 |
| 2005/0106410 A1* | 5/2005 | Jiang | .................. | B23K 35/0238 428/654 |
| 2006/0105193 A1* | 5/2006 | Burger | ................... | B23K 35/00 428/654 |
| 2007/0246509 A1* | 10/2007 | Koshigoe | .............. | B32B 15/016 228/101 |
| 2009/0020276 A1* | 1/2009 | Ueda | .................. | B23K 35/0233 165/177 |
| 2009/0020585 A1* | 1/2009 | Fukumoto | .......... | B23K 35/0233 228/56.3 |
| 2009/0165901 A1* | 7/2009 | Koshigoe | .............. | B32B 15/016 148/535 |
| 2011/0014494 A1* | 1/2011 | Matsumoto | .......... | B23K 1/0012 428/654 |
| 2011/0240280 A1* | 10/2011 | Izumi | .................. | B23K 1/0012 165/185 |
| 2011/0287276 A1* | 11/2011 | Izumi | ................. | B23K 35/0233 428/548 |
| 2011/0293468 A1* | 12/2011 | Suzuki | .................. | F28F 21/084 420/540 |
| 2012/0177947 A1* | 7/2012 | Abrahamsson | ...... | B23K 35/002 428/654 |
| 2013/0244051 A1* | 9/2013 | Matsumoto | ........ | B23K 35/0238 428/576 |
| 2013/0244055 A1* | 9/2013 | Kimura | ................ | B23K 35/288 428/654 |
| 2013/0260175 A1* | 10/2013 | Kimura | ................ | B23K 1/0004 428/654 |
| 2014/0158330 A1* | 6/2014 | Kuroda | ................... | F28F 3/025 165/170 |
| 2014/0158335 A1* | 6/2014 | Kuroda | ................ | B23K 1/0012 165/185 |
| 2014/0272463 A1* | 9/2014 | Marois | ............... | B23K 35/0233 428/654 |
| 2015/0004428 A1 | 1/2015 | Kamiya et al. | | |
| 2015/0118517 A1* | 4/2015 | Itoh | ........................ | C22C 21/00 428/654 |
| 2016/0169600 A1* | 6/2016 | Fukumoto | .............. | B23K 31/02 428/654 |
| 2016/0298914 A1* | 10/2016 | Kanno | .................... | B23K 1/00 |
| 2017/0115076 A1* | 4/2017 | Sakashita | ................ | C22C 21/00 |
| 2017/0246840 A1* | 8/2017 | Kuroda | ................ | B32B 15/016 |
| 2017/0304957 A1* | 10/2017 | Yoshino | ............... | B23K 35/288 |

FOREIGN PATENT DOCUMENTS

| | | | | |
|---|---|---|---|---|
| JP | 2002030367 A | * | 1/2002 | |
| JP | 2005232507 A | | 9/2005 | |
| JP | 2010095758 A | | 4/2010 | |
| JP | 2013133515 A | | 7/2013 | |
| JP | 2013155404 A | | 8/2013 | |
| JP | 5339560 B1 | * | 11/2013 | ......... B23K 35/0238 |
| JP | 2014114475 A | | 6/2014 | |
| WO | 2013111904 A1 | | 8/2013 | |

* cited by examiner

ALUMINUM ALLOY BRAZING SHEET HAVING HIGH STRENGTH, HIGH CORROSION RESISTANCE AND HIGH MATERIAL ELONGATION, AND METHOD OF MANUFACTURING HEAT EXCHANGER

CROSS-REFERENCE TO RELATED APPLICATIONS

The present application is a U.S. National Stage Application filed under 35 U.S.C. 371 of International Application No. PCT/JP2015/081474, filed Nov. 9, 2015, and claims priority of Japanese Patent Application No. 2014-227777, filed Nov. 10, 2014, both of which are incorporated herein by reference in their entirety.

TECHNICAL FIELD

The present invention relates to an aluminum alloy brazing sheet having high strength, high corrosion resistance, and high material elongation.

BACKGROUND ART

A heat exchanger using an aluminum product is widely used as a heat exchanger for a radiator, a car heater, an oil cooler, and an intercooler of a motor vehicle, an evaporator and a condenser of an automotive air conditioner, or a heat exchanger for hydraulic equipment and an industrial machine.

In recent years, since a heat exchanger tends to be reduced in weight from the view point of improving fuel consumption and space saving, the members used therein are required to have thin-wall high strength and high corrosion resistance. Particularly, since a tube material is used in a large amount, these requirements are high. Further, recently, uneven processing is sometimes applied to a formed tube for improving heat exchanging performance, and the processed portion may undergo large deformation accompanied by reduction in thickness. In this case, if the elongation of material is low, there is a problem that the material breaks during processing, or it is difficult to obtain a desired shape. To cope with such a problem, Patent Literature 1, for example, proposes an improvement in formability by transforming a sacrificial material and a core material into fibrous structure to equalize the deformability of the sacrificial material and the core material for the purpose of improving formability.

CITATION LIST

Patent Literature

[Patent Literature 1]
  Japanese Patent Laid-Open No. 2010-95758

SUMMARY OF INVENTION

Technical Problem

In the technique disclosed in Patent Literature 1, a certain degree of high elongation is expected, but the strength is not sufficient, and an increase in strength is desired. However, since elongation characteristics will be impaired if the increase in strength is intended to be achieved, there is a problem that it is difficult to satisfy the requirement in terms of both high strength and high elongation at the same time.

The present invention has been made considering the above circumstances as the background, and an object of the present invention is to provide an aluminum alloy brazing sheet having high strength, high corrosion resistance, and high material elongation.

Solution to Problem

For example, when the amount of Cu in a core material is increased for achieving further high strength based on the cited literature 1, the deformability of the core material will be higher than the deformability of a sacrificial material, resulting in an increase in the difference of deformability between both layers to reduce elongation. On the other hand, for example, when the amount of Zn in a sacrificial material is increased from the view point of improving corrosion resistance, the deformability of the sacrificial material will be higher than the deformability of a core material, also resulting in an increase in the difference of deformability between both layers to reduce elongation. On the other hand, in the invention of the present application, since the difference of deformability between both layers does not occur by increasing the amount of both Zn in a sacrificial material and Cu in a core material, further larger elongation can be obtained, and further, corrosion resistance can be improved by increasing the potential gap between the sacrificial material and the core material after brazing.

Specifically, the first aspect of the present invention is an aluminum alloy brazing sheet having high strength, high corrosion resistance, and high material elongation, comprising: an aluminum alloy clad material comprising a core material, one surface of the core material being clad with a sacrificial material and the other side of the core material being clad with an Al—Si-based or Al—Si—Zn-based brazing filler metal, wherein the core material has a composition containing, by mass %, 1.3 to 2.0% Mn, 0.6 to 1.3% Si, 0.1 to 0.5% Fe, and 0.7 to 1.3% Cu, with the balance comprising Al and unavoidable impurities; the sacrificial material has a composition containing, by mass %, more than 4.0% to 8.0% Zn, 0.7 to 2.0% Mn, 0.3 to 1.0% Si, 0.3 to 1.0% Fe, and 0.05 to 0.3% Ti, with the balance comprising Al and unavoidable impurities; in the state of material, the crystal grain structure of at least the core material has lamellar structure; the elongation of the material is 4% or more; and the tensile strength after brazing is 170 MPa or more.

The second aspect of the present invention is the aluminum alloy brazing sheet according to the first aspect of the present invention, wherein the crystal grain size of the core material in the longitudinal section parallel to a rolling direction after brazing is in the range of 30 to 200 μm.

The third aspect of the present invention is the aluminum alloy brazing sheet according to the first or second aspect of the present invention, wherein, in the core material, the density of second phase particles in the range of 0.2 to 0.7 μm in terms of the equivalent circle diameter is in the range of 1 to 30 pieces/μm².

The fourth aspect of the present invention is the aluminum alloy brazing sheet according to any one of the first to third aspects of the present invention, wherein the aluminum alloy brazing sheet is used for a heat exchanger member.

Hereinafter, the reason for limitation in the present invention will be described. Note that all the contents of components in a composition are represented by % by mass.

(Core Material Components)
Mn: 1.3 to 2.0%

Mn has the effect of increasing material strength by finely forming Al—Mn—Si-based and Al—Mn—Fe—Si-based second phase particles (dispersed particles) in a matrix. However, if the content thereof is less than 1.3%, the effect will not be sufficiently exhibited, and if the content thereof is more than 2.0%, a huge intermetallic compound will be formed during casting. Therefore, the Mn content is determined to be 1.3 to 2.0%. Note that, for the same reason, it is desirable to set the lower limit to 1.5% and the upper limit to 1.8%.

Si: 0.6 to 1.3%

Si has the effect of increasing material strength by finely forming Al—Mn—Si-based and Al—Mn—Fe—Si-based second phase particles (dispersed particles) in a matrix. However, if the content thereof is less than 0.6%, the effect will not be sufficiently exhibited, and if the content thereof is more than 1.3%, the melting point will decrease. Therefore, the Si content is determined to be 0.6 to 1.3%. Note that, for the same reason, it is desirable to set the lower limit to 0.7% and the upper limit to 1.1%.

Fe: 0.1 to 0.5%

Fe has the effect of improving the strength after brazing by forming Al—Mn—Fe-based and Al—Mn—Fe—Si-based second phase particles (crystallized material) in a matrix to thereby reduce recrystallized grains during brazing. However, if the content thereof is less than 0.1%, a crack will be easily formed during casting, resulting in difficulty in the production of materials. Further, if the content thereof is more than 0.5%, a huge intermetallic compound will be formed during casting. Therefore, the Fe content is determined to be 0.1 to 0.5%. Note that, for the same reason, it is desirable to set the lower limit to 0.15% and the upper limit to 0.45%.

Cu: 0.7 to 1.3%

Cu has the effect of being dissolved in a matrix to thereby increase material strength, the effect of increasing the resistance to local deformation of materials to thereby improve formability, and the effect of improving corrosion resistance since, when Cu is added to a core material, the potential of the core material will be made noble to thereby increase the potential difference between the core material and a sacrificial material. However, if the content thereof is less than 0.7%, the effect will not be sufficiently exhibited, and if the content thereof is more than 1.3%, the melting point will decrease. Therefore, the Cu content is determined to be 0.7 to 1.3%. Note that, for the same reason, it is desirable to set the lower limit to 0.8% and the upper limit to 1.2%.

(Sacrificial Material Components)
Zn: more than 4.0% to 8.0%

Zn has the effect of being dissolved in a matrix to thereby make potential base. Therefore, Zn has the effect of improving corrosion resistance of a brazing sheet since, when Zn is added to a sacrificial material, the potential difference between the sacrificial material and a core material is increased. Further, Zn dissolved in a matrix increases the resistance to local deformation of materials, which has the effect of further improving elongation combined with Cu in a core material. However, if the content thereof is 4.0% or less, the effect will not be sufficiently exhibited, and if the content thereof is more than 8.0%, the corrosion rate will increase to exhaust a sacrificial material at an early stage to thereby reduce corrosion resistance. Therefore, the Zn content is determined to be more than 4.0% to 8.0%. Note that, for the same reason, it is desirable to set the lower limit to 4.8% and the upper limit to 7.0%.

Si: 0.3 to 1.0%

When Si is added to a sacrificial material, Si forms Al—Mn—Si-based and Al—Mn—Fe—Si-based second phase particles (crystallized material) in a matrix. When an Al alloy is exposed to an alkali corrosion environment, the corrosion resistance thereof in an alkali corrosion environment can be improved by generating a large number of fine pitting corrosion using such second phase particles as starting points to thereby suppress the growth of pitting corrosion in the depth direction. However, if the content thereof is less than 0.3%, the effect will not be sufficiently exhibited, and if the content thereof is more than 1.0%, a huge intermetallic compound will be formed during casting. Therefore, the Si content is determined to be 0.3 to 1.0%. Note that, for the same reason, it is desirable to set the lower limit to 0.4% and the upper limit to 0.8%.

Mn: 0.7 to 2.0%

When Mn is added to a sacrificial material, Mn forms Al—Mn—Si-based, Al—Mn—Fe-based, and Al—Mn—Fe—Si-based second phase particles (crystallized material) in a matrix. When an Al alloy is exposed to an alkali corrosion environment, the corrosion resistance thereof in an alkali corrosion environment can be improved by generating a large number of fine pitting corrosion using such second phase particles as starting points to thereby suppress the growth of pitting corrosion in the depth direction. However, if the content thereof is less than 0.7%, the effect will not be sufficiently exhibited, and if the content thereof is more than 2.0%, a huge intermetallic compound will be formed during casting. Therefore, the Mn content is determined to be 0.7 to 2.0%. Note that, for the same reason, it is desirable to set the lower limit to 0.8% and the upper limit to 1.5%.

Fe: 0.3 to 1.0%

When Fe is added to a sacrificial material, Fe forms Al—Mn—Fe-based and Al—Mn—Fe—Si-based second phase particles (crystallized material) in a matrix. When an Al alloy is exposed to an alkali corrosion environment, the corrosion resistance thereof in an alkali corrosion environment can be improved by generating a large number of fine pitting corrosion using such second phase particles as starting points to thereby suppress the growth of pitting corrosion in the depth direction. However, if the content thereof is less than 0.3%, the effect will not be sufficiently exhibited, and if the content thereof is more than 1.0%, a huge intermetallic compound will be formed during casting. Therefore, the Fe content is determined to be 0.3 to 1.0%. Note that, for the same reason, it is desirable to set the lower limit to 0.4% and the upper limit to 0.8%.

Ti: 0.05 to 0.3%

Ti has the effect of improving corrosion resistance of materials since the concentration distribution formed by the peritectic reaction during casting remains during rolling to thereby make the form of corrosion lamellar. If the content thereof is less than 0.05%, the effect will be small, and if the content thereof is more than 0.3%, a huge intermetallic compound will be formed during casting. Therefore, the Ti content is determined to be 0.05 to 0.3%. Note that, for the same reason, it is desirable to set the lower limit to 0.08% and the upper limit to 0.2%.

(Crystal Grain Structure of Core Material is Lamellar Structure)

When a core material matrix structure is made into fiber structure, the fiber structure will show more uniform deformation than in the case of recrystallized structure, thereby improving elongation. When the structure of a core material is recrystallized structure or a mixed structure of fiber structure and recrystallized structure, the deformation in the core material will lack uniformity, resulting in reduction in elongation. The structure of a core material matrix is different depending on combination of core material components, homogenization conditions, process annealing conditions, and the like and cannot be unconditionally determined. However, particularly the process annealing conditions before final rolling are the most important and desirably set to the recrystallization temperature of a core material alloy or less.

Note that materials other than the core material in a brazing sheet may have lamellar structure.

(Elongation of Material: 4% or More)

In order not to cause a defect in assumed forming, the elongation of material needs to be 4% or more.

(Tensile Strength after Brazing: 170 MPa or More)

From the point of view of securing strength when used as a heat exchanger and the like, the strength after brazing needs to be 170 MPa or more.

(Crystal Grain Size of Core Material after Brazing: 30 to 200 μm)

In a thin-walled material, if crystal grains are large, the material will be easily nonuniformly deformed, resulting in reduction in elongation. Therefore, the material breaks before it reaches the maximum stress (tensile strength) that the material originally has, thereby resulting in apparent reduction in tensile strength. In order to prevent such a problem, the crystal grain size of a core material in the longitudinal section parallel to a rolling direction is desirably 200 μm or less. If the crystal grain size is more than 200 μm, a reduction in strength after brazing will be caused. On the other hand, if crystal grains are excessively fine, a brazing sheet will easily undergo brazing erosion during brazing, and if the crystal grain size is less than 30 μm, the brazing erosion resistance will be reduced.

Note that when the brazing sheet is brazed, it will be recrystallized in the temperature rise process (at a temperature lower than the temperature at which brazing filler metal melts). After recrystallizing, the size of crystal grains hardly changes. Therefore, since the size of recrystallized grains formed during erosion with brazing filler metal=the size of recrystallized grains after brazing, the size of recrystallized grains formed during erosion with brazing filler metal can be observed from the particle size after brazing.

(Distribution State of Second Phase Particles of 0.7 μm or Less in Core Material: The Density of Second Phase Particles in the Range of 0.2 to 0.7 μm in Terms of the Equivalent Circle Diameter is in the Range of 1 to 30 Pieces/μm$^2$)

The dispersion state of second phase particles in core material affects the recrystallization behavior of a material during brazing, and as a result affects the crystal grain size after brazing. Fine second phase particles (less than 0.2 μm) retard recrystallization to coarsen crystal grains after recrystallization. On the other hand, coarse second phase particles (more than 0.7 μm) accelerate recrystallization to make crystal grains after recrystallization fine. On the other hand, second phase particles in the range of 0.2 to 0.7 μm also have the effect of making crystal grains after recrystallization fine depending on the distribution state.

Note that most of second phase particles of more than 0.7 μm are formed during casting (crystallized material), and the distribution state is determined by the solidification rate during casting. Therefore, the control of the size of second phase particles is limited as long as the production is performed by DC casting which is normally performed.

On the other hand, second phase particles of 0.7 μm or less are formed when additive elements such as Mn, Si, and Fe which have been dissolved to supersaturation during casting are precipitated during heat treatment which is a step after casting (dispersed particles). Therefore, the size of second phase particles can be controlled by a production step.

Therefore, the crystal grain size can be made fine by making second phase particles in the range of 0.2 to 0.7 μm into a predetermined distribution state.

Further, the crystal grain size after brazing can desirably be made fine by dispersing second phase particles in the range of 0.2 to 0.7 μm in terms of the equivalent circle diameter in a proper amount in the range of 1 to 30 pieces/μm$^2$. If dispersion density is less than 1 piece/μm$^2$, the dispersion density will be too low to make crystal grains fine, and if dispersion density is more than 30 pieces/μm$^2$, the size of crystal grains after brazing will be excessively fine to reduce brazing erosion resistance.

The dispersion of the above second phase particles is achieved by performing homogenization treatment under a condition of low temperature for a long time, for example, at 550 to 610° C.×2 to 15 hours.

(An—Si-Based or Al—Si—Zn-Based Brazing Filler Metal)

One surface of the aluminum alloy brazing sheet of the present invention is clad with Al—Si-based or Al—Si—Zn-based brazing filler metal. The brazing filler metal that can be used includes JIS 4045+1 Zn alloy, 4343 alloy, 4045 alloy, and 4047 alloy. Further, a brazing filler metal to which Zn is not added or a brazing filler metal in which the amount of Zn added is increased can also be used. Further, Al—Si alloy and Al—Si—Zn alloy which contain Mn, Fe, Zr, Ti, Cu, Li, and the like can also be used, and in the present invention, the composition is not limited to a specific composition as long as Al and Si or Al, Si, and Zn are used as main components.

Advantageous Effects of Invention

As described above, according to the present invention, there can be obtained an aluminum alloy brazing sheet having high strength, high corrosion resistance, and high material elongation by specifying the components of a sacrificial material and a core material in a predetermined range and controlling the metal structure of the core material after brazing.

DESCRIPTION OF EMBODIMENT

Hereinafter, one embodiment of the present invention will be described.

An aluminum alloy for sacrificial material, an aluminum alloy for core material, and Al—Si-based or Al—Si—Zn-based brazing filler metal, which are in the composition range of the present invention, are prepared, respectively. These alloys and the like can be ingoted by a conventional method. The aluminum alloy for brazing filler metal is not particularly limited in the present invention as long as it is Al—Si-based or Al—Si—Zn-based, and examples thereof that can be used include JIS 4343 alloy, 4045 alloy, and 4047 alloy. Further, a brazing filler metal to which Zn is not added or a brazing filler metal in which the amount of Zn added is increased can also be used. Further, Al—Si alloy and Al—Si—Zn alloy which contain Mn, Fe, Zr, Ti, Cu, Li, and the like can also be used.

These alloys are ingoted and then optionally subjected to homogenization treatment. The homogenization treatment of a core material can be performed, for example, by heating at 550 to 610° C. for 2 to 15 hours. A brazing filler metal is not subjected to homogenization treatment or heated at 400 to 580° C. for 2 to 10 hours. A sacrificial material is not subjected to homogenization treatment or heated at 400 to 500° C. for 2 to 10 hours.

An ingot is formed into a sheet material through hot rolling. Further, an ingot may also be formed into a sheet material through continuous casting rolling.

These sheet materials are clad at a suitable clad ratio in the state where a sacrificial material is arranged on one side of a core material; a brazing filler metal is arranged on the other side thereof; and these materials are superposed.

The cladding is generally performed by hot rolling. Then, the hot-rolled sheet is further subjected to cold rolling to obtain an aluminum alloy brazing sheet having a desired thickness.

The hot rolling is performed by rough rolling that is controlled to a starting temperature in the range of 450 to 530° C., a final sheet thickness in the range of 15 to 30 mm, and a final temperature in the range of 330 to 430° C., followed by reverse finish rolling that is controlled to a starting sheet thickness in the range of 15 to 30 mm, a starting temperature in the range of 320 to 420° C., an final sheet thickness in the range of 1 to 4 mm, and an end temperature in the range of 200 to 320° C.

Metal structure is adjusted by adjusting the conditions of hot rolling to the above ranges, and an elongation of material of 4% or more can be obtained. For example, if rolling is performed at a higher temperature than the above, metal structure may be coarsened to reduce elongation. On the other hand, if rolling is performed at a lower temperature than the above, the rolling itself will be difficult.

In the above production process, process annealing can be interposed in the cold-rolling. In order to make the crystal grains of material lamellar, it is necessary to prevent the recrystallization of materials in the heat treatment by process annealing. For this purpose, the process annealing is preferably performed at a temperature in the range of 150 to 250° C.×2 to 10 hours. In the final cold rolling after the process annealing, the rolling is performed at a cold rolling rate of 5 to 25%, thus obtaining an H14 refined brazing sheet.

Examples of the thickness of the final brazing sheet include, but are not particularly limited to, a thickness of 0.15 to 0.25 mm.

Examples

The aluminum alloys having component compositions shown in Table 1 were subjected to semi-continuous casting to obtain aluminum alloy ingots for sacrificial material.

The aluminum alloys having component compositions shown in Table 2 were subjected to semi-continuous casting to obtain aluminum alloy ingots for core material.

Further, an alloy for brazing filler metal (4045 alloy) was cast by semi-continuous casting to obtain an aluminum alloy ingot for brazing filler metal.

The above aluminum alloy ingots for core material were subjected to homogenization treatment under the conditions shown in Tables 3-1, 3-2, 4-1, and 4-2, and the aluminum alloy ingot for brazing filler metal were subjected to homogenization treatment under a condition of 400° C. for 5 hours. The aluminum alloy ingots for sacrificial material were not subjected to homogenization treatment.

Hot rolling was performed by superposing the aluminum alloy ingot for sacrificial material on one side of the aluminum alloy ingot for core material and the aluminum alloy ingot for brazing filler metal on the other side thereof in combinations shown in Tables 3-1, 3-2, 4-1, and 4-2. In the above hot rolling, rough rolling was performed at a starting temperature of 500° C., a final sheet thickness of 20 mm, and a final temperature of 430° C. except for No. 29, 30, 31, 32, and 33, and finish rolling was performed under the conditions shown in Tables 3-1, 3-2, 4-1, and 4-2.

Note that, in Nos. 29, 30, and 31, rough rolling was performed at a starting temperature of 560° C., a final sheet thickness of 30 mm, and a final temperature of 510° C., and finish rolling was performed under the conditions shown in Tables 4-1 and 4-2.

Further, the ingot in No. 33 was rolled to 7 mm only by rough rolling.

Further, the clad material was subjected to the above cold rolling, and process annealing which also serves as the adjustment of crystal grain structure was then performed at 220° C. for 5 hours followed by final cold rolling, thereby preparing H14 refined brazing sheets Nos. 1 to 33 each having a thickness of 0.20 mm as test specimens.

TABLE 1

| Type | | Zn | Mn | Si | Fe | Ti | Remarks |
|---|---|---|---|---|---|---|---|
| Sacrificial material | a | 4.0 | 1.1 | 0.6 | 0.6 | 0.15 | Less than Zn lower limit |
| | b | 5.0 | 1.1 | 0.6 | 0.6 | 0.15 | |
| | c | 6.0 | 1.1 | 0.6 | 0.6 | 0.15 | |
| | d | 7.0 | 1.1 | 0.6 | 0.6 | 0.15 | |
| | e | 9.0 | 1.1 | 0.6 | 0.6 | 0.15 | More than Zn upper limit |
| | f | 6.0 | 0.5 | 0.6 | 0.6 | 0.15 | Less than Mn lower limit |
| | g | 6.0 | 0.8 | 0.6 | 0.6 | 0.15 | |
| | h | 6.0 | 1.3 | 0.6 | 0.6 | 0.15 | |
| | i | 6.0 | 2.2 | 0.6 | 0.6 | 0.15 | More than Mn upper limit |
| | j | 6.0 | 1.1 | 0.2 | 0.6 | 0.15 | Less than Si lower limit |
| | k | 6.0 | 1.1 | 0.4 | 0.6 | 0.15 | |
| | l | 6.0 | 1.1 | 0.9 | 0.6 | 0.15 | |
| | m | 6.0 | 1.1 | 1.3 | 0.6 | 0.15 | More than Si upper limit |
| | n | 6.0 | 1.1 | 0.6 | 0.2 | 0.15 | Less than Fe lower limit |
| | o | 6.0 | 1.1 | 0.6 | 0.4 | 0.15 | |
| | p | 6.0 | 1.1 | 0.6 | 0.9 | 0.15 | |
| | q | 6.0 | 1.1 | 0.6 | 1.3 | 0.15 | More than Fe upper limit |
| | r | 4.0 | 1.1 | 0.5 | 0.6 | 0.15 | Chemical components of the precedent example |
| | s | 5.5 | 1.1 | 0.5 | 0.6 | 0.15 | Chemical components of the precedent example |
| | t | 6.5 | 1.1 | 0.0 | 0.6 | 0.15 | Chemical components of the precedent example |

TABLE 2

| Type | | Mn | Si | Fe | Cu | Remarks |
|---|---|---|---|---|---|---|
| Core material | A | 1.0 | 0.8 | 0.25 | 1.1 | Less than Mn lower limit |
| | B | 1.4 | 0.8 | 0.25 | 1.1 | |
| | C | 1.6 | 0.8 | 0.25 | 1.1 | |
| | D | 1.9 | 0.8 | 0.25 | 1.1 | |
| | E | 2.3 | 0.8 | 0.25 | 1.1 | More than Mn upper limit |
| | F | 1.6 | 0.5 | 0.25 | 1.1 | Less than Si lower limit |
| | G | 1.6 | 0.6 | 0.25 | 1.1 | |
| | H | 1.6 | 1.1 | 0.25 | 1.1 | |
| | I | 1.6 | 1.5 | 0.25 | 1.1 | More than Si upper limit |
| | J | 1.6 | 0.8 | 0.05 | 1.1 | Less than Fe lower limit |
| | K | 1.6 | 0.8 | 0.20 | 1.1 | |
| | L | 1.6 | 0.8 | 0.45 | 1.1 | |
| | M | 1.6 | 0.8 | 0.6 | 1.1 | More than Fe upper limit |
| | N | 1.6 | 0.8 | 0.25 | 0.6 | Less than Cu lower limit |
| | O | 1.6 | 0.8 | 0.25 | 0.85 | |
| | P | 1.6 | 0.8 | 0.25 | 1.3 | |
| | Q | 1.6 | 0.8 | 0.25 | 1.5 | More than Cu upper limit |

The brazing sheets as test specimens were evaluated for the following characteristics under the following conditions, and the evaluation results were shown in Tables 3-1, 3-2, 4-1, and 4-2.

(Elongation of Material)

Samples were cut from the prepared brazing sheets in a direction parallel to a rolling direction to prepare test pieces each having a shape of JIS No. 13 B, which were subjected to a tensile test to measure the total elongation by a butt method. The stress rate was 3 mm/min. The results of measurement are shown in Tables 3-1, 3-2, 4-1, and 4-2.

When the material elongation was 4.0% or more, the material was evaluated as good, and when the elongation of material was less than 4.0%, the material was evaluated as poor.

(Crystal Structure of Material)

Small pieces of samples were cut from the prepared brazing sheets, embedded in resin in a direction parallel to a rolling direction, and mirror-finished by emery polishing and buffing. Then, the crystal grain structure was revealed by the Barker's solution method, and the crystal structure was observed with a polarizing microscope. The observation magnitude was 100 times. The evaluation results are shown in Tables 3-1, 3-2, 4-1, and 4-2.

(Strength after Brazing)

The prepared brazing sheets were subjected to a heat-treatment corresponding to brazing. Specifically, the brazing sheets were heated to 600° C. in about 7 minutes, maintained at 600° C. for 3 minutes, and then cooled at a cooling rate of 100° C./min. Samples were cut from the prepared brazing sheets in a direction parallel to a rolling direction to prepare test pieces each having a shape of JIS No. 13 B, which were subjected to a tensile test to measure the tensile strength. The stress rate was 3 mm/min. The results of measurement are shown in Tables 3-1, 3-2, 4-1, and 4-2.

When the strength after brazing was 175 MPa or more, the material was evaluated as excellent; when the strength after brazing was 170 MPa or more and less than 175 MPa, the material was evaluated as good; and when the strength was less than 170 MPa, the material was evaluated as poor.

(Crystal Grain Size after Brazing Heat Treatment)

The prepared brazing sheets were subjected to a heat-treatment corresponding to brazing. Specifically, the brazing sheets were heated to 600° C. in about 7 minutes, maintained at 600° C. for 3 minutes, and then cooled at a cooling rate of 100° C./min. The section parallel to a rolling direction of the samples subjected to the heat treatment corresponding to brazing was embedded in resin and then mirror polished. Then, crystal grains were revealed with an etchant (for example, by immersing the samples in Keller's solution at ordinary temperature for 1 to 3 minutes), and a photograph of five places of each sample was taken at a magnification of 200 times with an optical microscope. The photograph taken was measured for crystal grain size by an intercept method in the rolling direction. The results of the measurement are shown in Tables 3-1, 3-2, 4-1, and 4-2.

(Distribution State of Second Phase Particles of 0.7 μm or Less in Core Material)

The number density (pieces/μm$^2$) of second phase particles in the range of 0.2 to 0.7 μm in terms of the equivalent circle diameter was measured with a transmission electron microscope (TEM).

In the measuring method, material was subjected to salt bath annealing for 400° C.×15 seconds to remove deformation strain to allow easy observation of second phase particles; then, a thin film was prepared from the central part of core material with mechanical polishing and electrolytic polishing by a common method; and a photograph of the thin film was taken at a magnification of 10000 times with a transmission electron microscope. Photographs of five visual fields (about 500 μm$^2$ in total) were taken and measured for the size and number density of second phase particles by image analysis. The results of the measurement are shown in Tables 3-1, 3-2, 4-1, and 4-2.

The number density (pieces/μm$^2$) of second phase particles in the range of 0.2 to 0.7 μm in terms of the equivalent circle diameter is shown in Tables 3-1, 3-2, 4-1, and 4-2.

(Brazing Erosion Resistance (Erosion Depth))

The prepared brazing sheets were subjected to a heat-treatment corresponding to brazing. Specifically, the brazing sheets were heated to 600° C. in about 7 minutes, maintained at 600° C. for 3 minutes, and then cooled at a cooling rate of 100° C./min. The samples subjected to the heat treatment corresponding to brazing were embedded in resin, and a section parallel to a rolling direction of the samples were mirror polished and revealed a structure with the Barker's solution. Then, the structure was observed with an optical microscope to measure the brazing erosion depth, which was evaluated as brazing resistance. The evaluation results are shown in Tables 3-1, 3-2, 4-1, and 4-2.

When melting occurred, the sample was evaluated as poor; when melting did not occur and the erosion melting depth was less than 30 μm, the sample was evaluated as excellent; and when the erosion melting depth was 30 μm or more and less than 50 μm, the sample was evaluated as good.

(Internal Corrosion Resistance (Acidic))

The prepared brazing sheets were subjected to a heat-treatment corresponding to brazing. Specifically, the brazing sheets were heated to 600° C. in about 7 minutes, maintained at 600° C. for 3 minutes, and then cooled at a cooling rate of 100° C./min. A sample having a size of 30×40 mm was cut from the sample after brazing heat treatment, and the surfaces thereof other than a sacrificial material surface (ends and a brazing filler metal surface) were masked. The masked samples were subjected to immersion test for 8 weeks in a cycle of 80° C.×8 hours→room temperature×16 hours in an aqueous solution (OY water) containing 195 ppm of Cl—, 60 ppm of $SO_4^{2-}$, 1 ppm of $Cu^{2+}$, and 30 ppm of $Fe^{3+}$. The samples after corrosion test were immersed in a boiled mixed solution of phosphoric acid and chromic acid for 10 minutes to remove a corrosion product, and then the section of the maximum corrosion part was observed to measure the corrosion depth. The evaluation results are shown in Tables 3-1, 3-2, 4-1, and 4-2.

When the corrosion depth was less than 50 μm, the sample was evaluated as excellent; when the corrosion depth was 50 μm or more and less than 80 μm, the sample was evaluated as good; and when the corrosion depth was 80 μm or more, the sample was evaluated as poor.

(Internal Corrosion Resistance (Alkaline))

The prepared brazing sheets were subjected to a heat-treatment corresponding to brazing. Specifically, the brazing sheets were heated to 600° C. in about 7 minutes, maintained at 600° C. for 3 minutes, and then cooled at a cooling rate of 100° C./min. A sample having a size of 30×40 mm was cut from the sample after brazing heat treatment, and the surfaces thereof other than a sacrificial material surface (ends and a brazing filler metal surface) were masked. An aqueous solution (OY water), in which Cl— was adjusted to 195 ppm; $SO_4^{2-}$ was adjusted to 60 ppm; $Cu^{2+}$ was adjusted to 1 ppm; and $Fe^{3+}$ was adjusted to 30 ppm, was further adjusted to a pH of 11 with caustic soda. The masked samples were subjected to immersion test for 8 weeks in a cycle of 80° C.×8 hours→room temperature×16 hours in the adjusted solution. The samples after corrosion test were immersed in a boiled mixed solution of phosphoric acid and chromic acid for 10 minutes to remove a corrosion product, and then the section of the maximum corrosion part was observed to measure the corrosion depth. The evaluation results are shown in Tables 3-1, 3-2, 4-1, and 4-2.

When the corrosion depth was less than 80 μm, the sample was evaluated as good; and when the corrosion depth was 80 μm or more, the sample was evaluated as poor.

As the overall evaluation, when all the evaluations were good or more, the samples were evaluated as good; and when all the evaluations are good or more and the strength after brazing, corrosion resistance (acid), and brazing resistance were excellent, the samples were evaluated as excellent.

As shown in Tables 3-1, 3-2, 4-1, and 4-2, in Inventive Examples, material elongation, tensile strength, and corrosion resistance were excellent, and the overall evaluation was good or excellent.

On the other hand, in Comparative Examples, at least one of material elongation, tensile strength, and corrosion resistance was poor. Note that, in both Comparative Examples 13 and 18, it was unable to produce clad material.

TABLE 3

| | No. | Starting temperature | End temperature | Final sheet thickness | Sacrificial material | Core material | Sacrificial material structure | Core material structure | Core material homogenization treatment |
|---|---|---|---|---|---|---|---|---|---|
| Comparative example | 1 | 400° C. | 250° C. | 3 mm | a | N | Lamellar | Lamellar | 550° C. × 10 h |
| | 2 | 400° C. | 250° C. | 3 mm | e | N | Lamellar | Lamellar | 550° C. × 10 h |
| | 3 | 400° C. | 250° C. | 3 mm | f | N | Lamellar | Lamellar | 550° C. × 10 h |
| | 5 | 400° C. | 250° C. | 3 mm | i | N | Lamellar | Lamellar | 550° C. × 10 h |
| | 5 | 400° C. | 250° C. | 3 mm | j | N | Lamellar | Lamellar | 550° C. × 10 h |
| | 6 | 400° C. | 250° C. | 3 mm | m | N | Lamellar | Lamellar | 550° C. × 10 h |
| | 7 | 400° C. | 250° C. | 3 mm | n | N | Lamellar | Lamellar | 550° C. × 10 h |
| | 8 | 400° C. | 250° C. | 3 mm | q | N | Lamellar | Lamellar | 550° C. × 10 h |
| | 9 | 400° C. | 250° C. | 3 mm | c | A | Lamellar | Lamellar | 550° C. × 10 h |
| Present invention | 10 | 400° C. | 250° C. | 3 mm | c | B | Lamellar | Lamellar | 550° C. × 10 h |
| | 11 | 400° C. | 250° C. | 3 mm | c | C | Lamellar | Lamellar | 550° C. × 10 h |
| | 12 | 400° C. | 250° C. | 3 mm | c | D | Lamellar | Lamellar | 550° C. × 10 h |
| Comparative example | 13 | 400° C. | 250° C. | 3 mm | c | E | Lamellar | Lamellar | Not manufacturable |
| | 14 | 400° C. | 250° C. | 3 mm | c | F | Lamellar | Lamellar | 550° C. × 10 h |
| Present invention | 15 | 400° C. | 250° C. | 3 mm | c | G | Lamellar | Lamellar | 550° C. × 10 h |
| | 16 | 400° C. | 250° C. | 3 mm | c | H | Lamellar | Lamellar | 550° C. × 10 h |
| Comparative example | 17 | 400° C. | 250° C. | 3 mm | c | I | Lamellar | Lamellar | 550° C. × 10 h |
| | 18 | 400° C. | 250° C. | 3 mm | c | J | Lamellar | Lamellar | Difficult in manufacturing |
| Present invention | 19 | 400° C. | 250° C. | 3 mm | c | K | Lamellar | Lamellar | 550° C. × 10 h |
| | 20 | 400° C. | 250° C. | 3 mm | c | L | Lamellar | Lamellar | 550° C. × 10 h |
| Comparative example | 21 | 400° C. | 250° C. | 3 mm | c | M | Lamellar | Lamellar | 550° C. × 10 h |
| | 22 | 400° C. | 250° C. | 3 mm | c | N | Lamellar | Lamellar | 550° C. × 10 h |
| Present invention | 23 | 400° C. | 250° C. | 3 mm | c | P | Lamellar | Lamellar | 550° C. × 10 h |
| Comparative example | 24 | 400° C. | 250° C. | 3 mm | c | Q | Lamellar | Lamellar | 550° C. × 10 h |

| | No. | Second phase particles (pieces/$\mu m^2$) | Crystal grain size ($\mu$m) | Elongation of base material Less than 4.0 X 4.0 or more ○ | TS after brazing less than 170 X 170 or more ○ 175 or more ○○ | Corrosion resistance (acidic) 80 or more X Less than 80 ○ Less than 50 ○○ |
|---|---|---|---|---|---|---|
| Comparative example | 1 | 21 | 220 | 3.8X | 174○ | X |
| | 2 | 21 | 220 | 6.0○ | 174○ | ○○ |
| | 3 | 21 | 220 | 5.5○ | 174○ | ○○ |
| | 5 | 21 | 220 | 3.5X | 179○○ | ○○ |
| | 5 | 21 | 220 | 5.5○ | 168X | ○○ |
| | 6 | 21 | 200 | 3.6X | 183○○ | ○○ |
| | 7 | 21 | 220 | 4.5○ | 173○ | ○○ |
| | 8 | 21 | 220 | 4.5○ | 178○○ | X |
| | 9 | 23 | 210 | 5.5○ | 168X | ○○ |
| Present invention | 10 | 25 | 215 | 5.5○ | 177○○ | ○○ |
| | 11 | 25 | 220 | 5.5○ | 180○○ | ○○ |
| | 12 | 29 | 240 | 5.5○ | 186○○ | ○○ |
| Comparative example | 13 | Not manufacturable | Not manufacturable | Not manufacturable | Not manufacturable | Not manufacturable |
| | 14 | 35 | 210 | 5.5○ | 165X | ○○ |
| Present invention | 15 | 28 | 220 | 5.5○ | 175○○ | ○○ |
| | 16 | 29 | 240 | 5.5○ | 190○○ | ○○ |
| Comparative example | 17 | 30 | 250 | 4.5○ | Melting | Melting |
| | 18 | Difficult in manufacturing | Difficult in manufacturing | Difficult in manufacturing | Difficult in manufacturing | Difficult in manufacturing |
| Present invention | 19 | 25 | 220 | 5.5○ | 179○○ | ○○ |
| | 20 | 25 | 215 | 5.5○ | 184○○ | ○○ |
| Comparative example | 21 | 25 | 205 | 3.4X | — | — |
| | 22 | 25 | 220 | 3.8X | 160X | ○○ |
| Present invention | 23 | 25 | 220 | 5.5○ | 188○○ | ○○ |
| Comparative example | 24 | 25 | 220 | 5.7○ | 196○○ | Melting |

TABLE 3-continued

| No. | | | Corrosion resistance (alkaline) 80 or more X Less than 80 ○ | Brazing resistance melting X Less than 50 μm ○ Less than 30 μm ○○ | Overall evaluation All ○ or more ○ All ○ or more and TS, corrosion resistance(acidic) and brazing resistance ○○:○○ | Remarks | |
|---|---|---|---|---|---|---|---|
| Comparative example | 1 | | X | ○○ | X | Zn lower limit | Short of potential difference |
| | 2 | | X | ○○ | X | Zn upper limit | |
| | 3 | | X | ○○ | X | Mn lower limit | |
| | 5 | | X | ○○ | X | Mn upper limit | |
| | 5 | | X | ○○ | X | Si lower limit | |
| | 6 | | X | ○○ | X | Si upper limit | |
| | 7 | | X | ○○ | X | Fe lower limit | |
| | 8 | | X | ○○ | X | Fe upper limit | |
| | 9 | | ○ | ○○ | X | Mn lower limit | |
| Present invention | 10 | | ○ | ○○ | ○○ | | |
| | 11 | | ○ | ○○ | ○○ | | |
| | 12 | | ○ | ○○ | ○○ | | |
| Comparative example | 13 | | Not manufacturable | Not manufacturable | Not manufacturable | Mn upper limit | Not manufacturable |
| | 14 | | ○ | ○○ | X | Si lower limit | |
| Present invention | 15 | | ○ | ○○ | ○○ | | |
| | 16 | | ○ | ○○ | ○○ | | |
| Comparative example | 17 | | Melting | X | X | Si upper limit | Melting when brazing |
| | 18 | | Difficult in manufacturing | Difficult in manufacturing | Difficult in manufacturing | Fe lower limit | Cast crack |
| Present invention | 19 | | ○ | ○○ | ○○ | | |
| | 20 | | ○ | ○○ | ○○ | | |
| Comparative example | 21 | | — | ○○ | X | Fe upper limit | Not manufacturable |
| | 22 | | ○ | ○○ | X | Cu lower limit | |
| Present invention | 23 | | ○ | ○○ | ○○ | | |
| Comparative example | 24 | | Melting | X | X | Cu upper limit | Melting when brazing |

TABLE 4

| | No. | Starting temperature | End temperature | Final sheet thickness | Sacrificial material | Core material | Sacrificial material structure | Core material structure | Core material homogenization treatment |
|---|---|---|---|---|---|---|---|---|---|
| Comparative example | 25 | 400° C. | 250° C. | 3 mm | r | N | Lamellar | Lamellar | 550° C. × 10 h |
| | 26 | 400° C. | 250° C. | 3 mm | s | M | Lamellar | Lamellar | 550° C. × 10 h |
| | 27 | 400° C. | 250° C. | 3 mm | t | M | Lamellar | Lamellar | 550° C. × 10 h |
| | 28 | 400° C. | 250° C. | 3 mm | c | N | Lamellar | Recrystallization | 550° C. × 10 h |
| | 29 | 480° C. | 300° C. | 3 mm | j | N | Lamellar | Lamellar | 550° C. × 10 h |
| | 30 | 510° C. | 300° C. | 3 mm | j | N | Lamellar | Lamellar | 550° C. × 10 h |
| | 31 | 510° C. | 350° C. | 3 mm | j | N | Lamellar | Lamellar | 550° C. × 10 h |
| | 32 | 420° C. | 330° C. | 4.2 mm | j | N | Lamellar | Lamellar | 550° C. × 10 h |
| | 33 | Rolled to 7 mm only by rough rolling | | | j | N | Lamellar | Lamellar | 550° C. × 10 h |

| | | Second phase particles | Crystal grain | Elongation of base material Less than 4.0 X | TS after brasing Less than 170 X 170 or more ○ | Corrosion resistance (acidic) 80 or more X Less than 80 ○ Less than |
|---|---|---|---|---|---|---|

TABLE 4-continued

| | No. | (pieces/μm²) | size(μm) | 4.0 or more ○ | 175 or more ○○ | 50 ○○ |
|---|---|---|---|---|---|---|
| Comparative example | 25 | 21 | 220 | 3.8X | 174○ | X |
| | 26 | 21 | 220 | 3.8X | 160X | ○ |
| | 27 | 21 | 220 | 3.5X | 160X | ○ |
| | 28 | 21 | 220 | 2.3X | 174○ | ○○ |
| | 29 | 20 | 200 | 4.8○ | 168X | ○○ |
| | 30 | 19 | 190 | 4.4○ | 168X | ○○ |
| | 31 | 19 | 185 | 4.1○ | 168X | ○○ |
| | 32 | 20 | 210 | 4.6○ | 168X | ○○ |
| | 33 | 20 | 210 | 4.5○ | 168X | ○○ |

| | No. | Corrosion resistance (alkaline) 80 or moreX Less than 80○ | Brazing resistance melting X Less than 50 μm○ Less than 30 μm○○ | Overall evaluation All ○ or more ○ All ○ or more, and TS, corrosion Resistance (acidic) and brazing resistance ○○:○○ | Remarks |
|---|---|---|---|---|---|
| Comparative example | 25 | X | ○○ | X | |
| | 26 | ○ | ○○ | X | |
| | 27 | ○ | ○○ | X | |
| | 28 | ○ | ○○ | X | Core material Recrystallized structure |
| | 29 | X | ○○ | X | Si lower limit |
| | 30 | X | ○○ | X | Si lower limit |
| | 31 | X | ○○ | X | Si lower limit |
| | 32 | X | ○○ | X | Si lower limit |
| | 33 | X | ○○ | X | Si lower limit |

The invention claimed is:

1. An aluminum alloy brazing sheet configured to be subjected to brazing, the brazing sheet comprising an aluminum alloy clad material comprising a core material having a first surface and a second surface, the first surface of the core material being clad with a sacrificial material, and the second surface of the core material being clad with a brazing filler metal which is Al—Si-based or Al—Si—Zn-based, wherein:
   the core material has a composition containing 1.3 to 2.0% Mn, 0.6 to 1.3% Si, 0.2 to 0.5% Fe and 0.85 to 1.3% Cu, by mass, with the balance comprising Al and unavoidable impurities;
   the sacrificial material has a composition containing more than 4.0% and up to and including 8.0% Zn, 0.7 to 2.0% Mn, 0.3 to 1.0% Si, 0.3 to 1.0% Fe and 0.05 to 0.3% Ti, by mass, with the balance comprising Al and unavoidable impurities;
   the core material has a lamellar crystal grain structure;
   the brazing sheet has an elongation of at least 4%; and
   the brazing sheet has a tensile strength of at least 170 MPa after a heat treatment corresponding to brazing, the heat treatment comprising heating the brazing sheet of 600° C. in about 7 minutes, maintaining the brazing sheet at 600° C. for 3 minutes, and then cooling the brazing sheet at a cooling rate of 100° C./min.

2. The aluminum alloy brazing sheet according to claim 1, wherein the crystal grain size of the core material in a longitudinal section parallel to a rolling direction after the heat treatment corresponding to brazing is in a range of 30 to 200 μm.

3. The aluminum alloy brazing sheet according to claim 1, wherein the core material, before brazing, comprises second phase particles having a crystal grain size of 0.2 to 0.7 μm in terms of an equivalent circle diameter, which have a density of 1 to 30 pieces/μm².

4. The aluminum alloy brazing sheet according to claim 1, wherein the aluminum alloy brazing sheet is a heat exchanger member.

5. The aluminum alloy brazing sheet according to claim 2, wherein the core material, before brazing, comprises second phase particles having a crystal grain size of 0.2 to 0.7 μm in terms of an equivalent circle diameter, which have a density of 1 to 30 pieces/μm².

6. The aluminum alloy brazing sheet according to claim 2, wherein the aluminum alloy brazing sheet is a heat exchanger member.

7. The aluminum alloy brazing sheet according to claim 3, wherein the aluminum alloy brazing sheet is a heat exchanger member.

8. The aluminum alloy brazing sheet according to claim 5, wherein the aluminum alloy brazing sheet is a heat exchanger member.

9. A method of manufacturing a heat exchanger, the method comprising:
   forming the aluminum alloy brazing sheet according to claim 1 into a first heat exchanger member; and
   brazing said heat exchanger member and a second heat exchanger member.

* * * * *